US008649338B2

(12) United States Patent
Vrzic et al.

(10) Patent No.: US 8,649,338 B2
(45) Date of Patent: Feb. 11, 2014

(54) APPARATUS AND METHOD FOR MOBILE ASSISTED ADAPTIVE FFR

(75) Inventors: Sophie Vrzic, Nepean (CA); Mo-Han Fong, Ottawa (CA)

(73) Assignee: Apple Inc., Cupertino, CA (US)

( * ) Notice: Subject to any disclaimer, the term of this patent is extended or adjusted under 35 U.S.C. 154(b) by 571 days.

(21) Appl. No.: 12/830,909

(22) Filed: Jul. 6, 2010

(65) Prior Publication Data

US 2012/0008569 A1   Jan. 12, 2012

(51) Int. Cl.
*H04B 17/00* (2006.01)
*H04W 72/12* (2009.01)

(52) U.S. Cl.
USPC ............................. 370/329; 370/436; 370/328

(58) Field of Classification Search
USPC ........... 370/329, 337, 328, 436; 455/450, 425
See application file for complete search history.

(56) References Cited

U.S. PATENT DOCUMENTS

| 6,363,252 | B1* | 3/2002 | Hamalainen et al. | 455/436 |
|---|---|---|---|---|
| 8,103,281 | B2* | 1/2012 | Rouffet et al. | 455/447 |
| 8,169,977 | B2* | 5/2012 | Laroia et al. | 370/335 |
| 2006/0251030 | A1* | 11/2006 | Anderson et al. | 370/338 |
| 2008/0268833 | A1* | 10/2008 | Huang et al. | 455/425 |
| 2009/0061778 | A1 | 3/2009 | Vrzic et al. | |
| 2009/0081970 | A1* | 3/2009 | Yavuz et al. | 455/114.2 |
| 2010/0105406 | A1* | 4/2010 | Luo et al. | 455/452.2 |

OTHER PUBLICATIONS

Hamiti, Shkumbin. The Draft IEEE 802.16m System Description Document, submitted Apr. 30, 2008. [http://www.ieee802.org/16/tgm/docs/80216m-08_003r1.pdf].

* cited by examiner

*Primary Examiner* — Thai Nguyen
(74) *Attorney, Agent, or Firm* — Meyertons, Hood, Kivlin, Kowert & Goetzel, P.C.

(57) ABSTRACT

In a method of fractional frequency reuse in a communication network, a frequency band is divided into a plurality of sub-bands according to a Fractional Frequency Reuse (FFR) scheme to define a FFR allocation of the band for a plurality of bases stations, each of the base stations being associated with a respective region. At a first base station of the plurality of base stations, the first base station associated with a first region, communication with a mobile terminal in the first region is established on one of the plurality of sub-bands according to the FFR allocation. A second base station of the plurality of base stations, the second base station associated with a second region, transmits on the one of the plurality of sub-bands according to the FFR allocation; receives an indication of a coverage problem detected at the mobile terminal due to interference from the second base station on the one of the plurality of sub-bands; and in response to the receiving the indication, decreases a transmit power level for the one of the plurality of sub-bands in the second region.

6 Claims, 8 Drawing Sheets

APPARATUS AND METHOD FOR MOBILE ASSISTED ADAPTIVE FFR

RELATED APPLICATIONS

This application claims the benefit of U.S. Provisional Patent Application No. 61/222,950 (converted to U.S. patent application Ser. No. 12/806,183), filed in the United States Patent Office on Jul. 3, 2009, the contents of which are incorporated by reference herein.

This application is a continuation-in-part of the non-provisional application Ser. No. 12/806,183 resulting from conversion under 37 C.F.R. §1.53(c)(3) of U.S. provisional patent application No. 61/222,950 filed on Jul. 3, 2009, which claims the benefit of U.S. provisional patent application No. 61/078,534 filed on Jul. 7, 2008.

FIELD OF THE INVENTION

The present invention relates to the field of wireless communications and more particularly to a method and system for the fractional reuse of frequencies in a manner that adapts to channel environment of the wireless communication network.

BACKGROUND

Wireless communication networks, such as cellular networks, operate by sharing resources among the mobile terminals operating in the communication network. As part of the sharing process, resources relating to which channels, codes, etc., are allocated by one or more controlling devices within the system. Certain types of wireless communication networks, e.g., orthogonal frequency division multiplexed ("OFDM") networks, are used to support cell-based high speed services such as those under the IEEE 802.16 standards. The IEEE 802.16 standards are often referred to as WiMAX or less commonly as WirelessMAN or the Air Interface Standard. Another emerging standard that has not yet been ratified, but appears likely to use the OFDM modulation scheme is referred to as Long Term Evolution (LTE). Other networking protocols may also use OFDM.

OFDM technology uses a channelized approach and divides a wireless communication channel into many sub-channels which can be used by multiple mobile terminals at the same time. These sub-channels and hence the mobile terminals can be subject to interference from adjacent cells because neighbouring base stations can use the same frequency blocks.

As such, a method is needed to adjust the output power of the base stations to a value which enables mobile terminals at the cell edge to still communicate at an acceptable rate while not creating too much interference in neighbouring cells. A method, described below, has been proposed to reduce interference caused by neighbouring base stations using the same frequency blocks and thereby help to increase mobile terminal throughput and overall network capacity.

For cell edge mobile terminals, i.e., mobile terminals near the edge of a cell, a base station has to use more transmission power in order to reach them. Cell centre mobile terminals, i.e., mobile terminals near the base station, require much less transmission power to receive the signal. Because known mobile terminals only transmit and receive on some but not all sub-channels of the frequency band, transmission power of sub-channels used by mobile terminals close to a base station can be lower than the transmission power of sub-channels used by mobile terminals at the cell edge. In practice, the reduced transmission power for sub-channels used by mobile terminals close to a base station creates less interference for mobile terminals close to other base stations.

It is known that a combination of high and low power sub-channels can be used to increase the overall coverage of the network compared to networks which use the same transmission power for all sub-channels. Base stations can be organized in a way to use the same set of sub-channels to serve subscribers close to them with a low transmission power. The remainder of the sub-channels are used with a higher transmission power and can be used by both distant and close subscribers. To minimize interference of high power sub-channels for clients of neighbouring base stations the cells are further organized in a way that two adjacent cells do not use the same high power sub-channels. As such, cell edge mobile terminals can be scheduled on the high power sub-channels that are not used or are used with lower transmit power by the neighbouring sectors. This approach is known as fractional frequency re-use ("FFR") as all base stations use the same frequency band with different power level restriction on different sub-channels.

Known fractional frequency reuse (FFR) schemes include hard and soft FFR schemes. Reuse, refers to the quantity of cells or sectors serviced by a base station. In such existing FFR solutions, however, the reuse factor, i.e., pattern, is fixed. In other words, the reuse arrangement of high power sub-channels and low power sub-channels within a cell can not be changed, even though the conditions within the cell have changed, either for the better or worse. Thus, there will always be some impact on throughput in known systems even when there are no coverage problems. Fixed FFR schemes, in addition, require frequency planning. In soft reuse, a portion of the tones are used with lower power, whereas, in hard reuse, a portion of the tones are not used at all.

United States Patent Application Number 2009/0061778, the contents of which are incorporated by reference herein, discloses a method and system for FFR whereby a base station serving a cell or sector sends a power level adjustment indicator over the backhaul network to a list of neighbouring base stations when it detects a coverage problem. The neighbour list can be either pre-configured or can be created dynamically by including the most dominant interferers of each of the mobile terminals being served. This approach provides a way of slowly adapting power of interfering base stations, and can be used to adapt many base stations since the serving base station can send power level adjustment commands to a number of neighbouring base stations over the backhaul network.

A need exists for new FFR methods and systems that allow for the reuse of frequencies based on the detection of coverage problems within the cell or sector.

SUMMARY OF THE INVENTION

In accordance with an aspect of the present invention, there is provided a method of fractional frequency reuse in a communication network. The method comprises: dividing a frequency band into a plurality of sub-bands according to a Fractional Frequency Reuse (FFR) scheme to define a FFR allocation of the band for a plurality of base stations, each of the base stations associated with a respective region; at a first base station of the plurality of base stations, the first base station associated with a first region: establishing communication with a mobile terminal in the first region on one of the plurality of sub-bands according to the FFR allocation; at a second base station of the plurality of base stations, the second base station associated with a second region: transmitting on the one of the plurality of sub-bands according to the FFR allocation; receiving an indication of a coverage problem detected at the mobile terminal due to interference from the second base station on the one of the plurality of sub-bands; and in response to the receiving the indication, decreasing a transmit power level for the one of the plurality of sub-bands in the second region.

In accordance with another aspect of the present invention, there is provided a mobile terminal comprising logic operable to: establish a connection in one of a plurality of sub-bands to a first base station associated with a first region, wherein the plurality of sub-bands are allocated to the first base station according to a Fractional Frequency Reuse (FFR) scheme; detect a coverage problem due to interference on the one of the plurality of sub-bands from a second base station associated with a second region, wherein the plurality of sub-bands are allocated to the second base station according to the Fractional Frequency Reuse (FFR) scheme; and send an indication of the coverage problem to the second base station.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate embodiments of the invention by example only.

DETAILED DESCRIPTION

Figure 1:
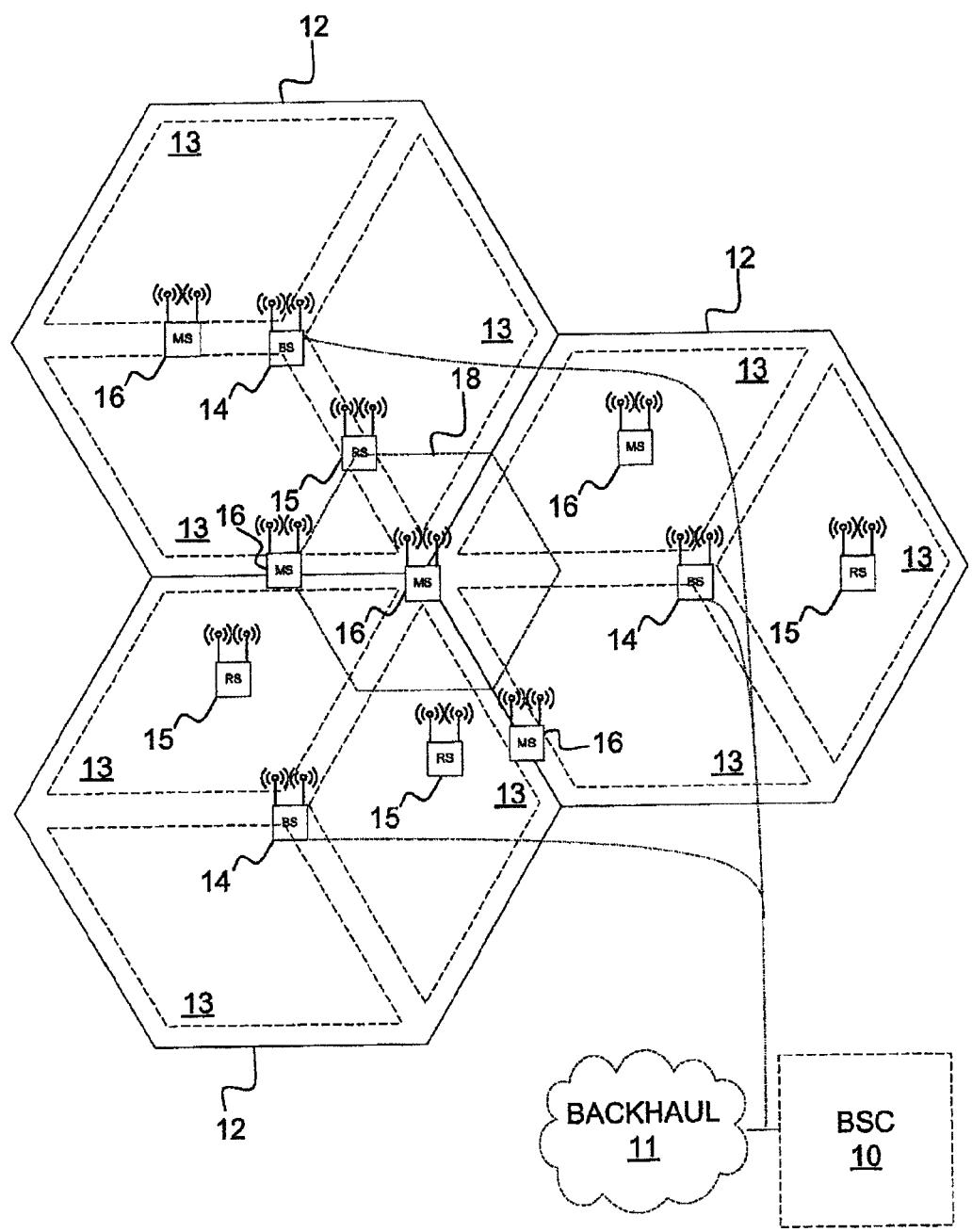
FIG. 1 is a block diagram of a cellular communication system.

Referring now to the drawing figures in which like reference designators refer to like elements, FIG. 1 shows a base station controller (BSC) 10 which controls wireless communications within multiple cells 12, which cells are served by corresponding base stations (BS) 14. In some configurations, each cell is further divided into multiple sectors 13 (not shown). In general, each base station 14 facilitates communications using OFDM with mobile terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. In some configurations, relay stations 15 may assist in communications between base stations 14 and mobile terminals 16. Mobile terminals 16 can be handed off 18 from any cell 12, sector 13 (not shown), base station 14 or relay 15 to an other cell 12, sector 13 (not shown), base station 14 or relay 15. In some configurations, base stations 14 communicate with each and with another network (such as a core network or the internet, both not shown) over a backhaul network 11. In some configurations, a base station controller 10 is not needed.

Figure 2:
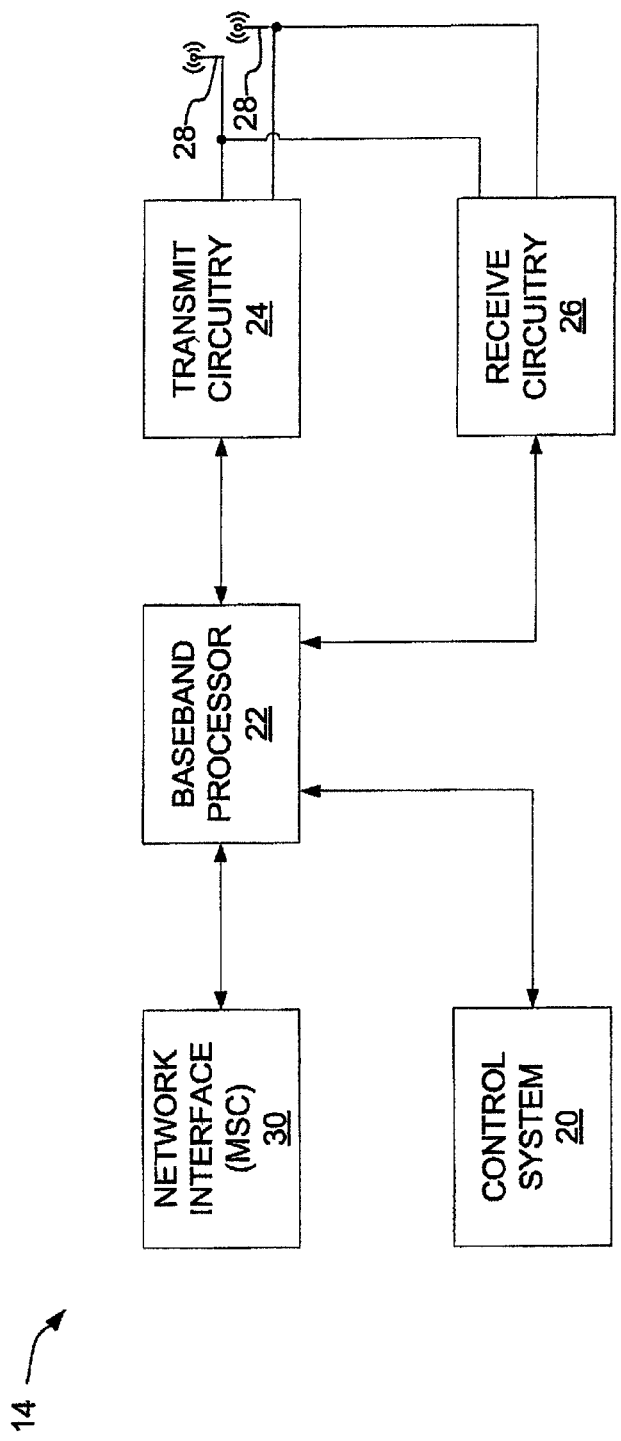
FIG. 2 is a block diagram of an example base station that might be used to implement some embodiments of the present application.

With reference to FIG. 2, an example of a base station 14 is illustrated. The base station 14 generally includes a control system 20, a baseband processor 22, transmit circuitry 24, receive circuitry 26, antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
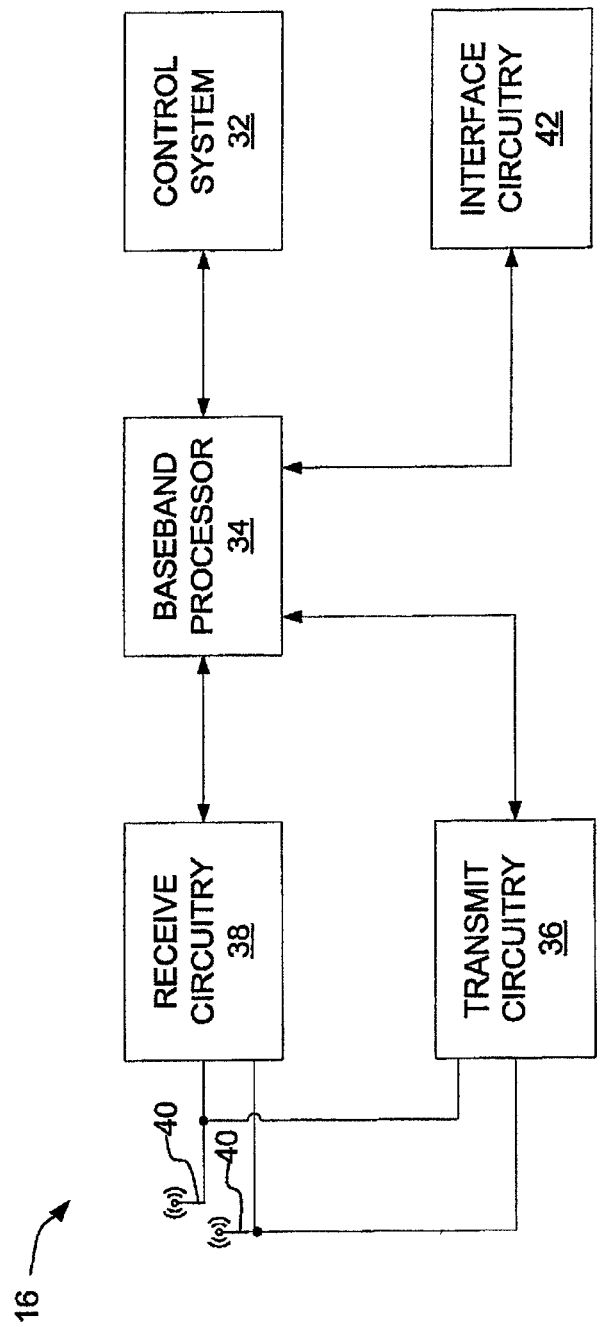
FIG. 3 is a block diagram of an example mobile terminal that might be used to implement some embodiments of the present application.

With reference to FIG. 3, an example of a mobile terminal 16 is illustrated. Similarly to the base station 14, the mobile terminal 16 will include a control system 32, a baseband processor 34, transmit circuitry 36, receive circuitry 38, antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In one embodiment, OFDM is preferably used for at least downlink transmission from the base stations 14 to the mobile terminals 16. Each base station 14 is equipped with "n" transmit antennas 28 (n>=1), and each mobile terminal 16 is equipped with "m" receive antennas 40 (m>=1). Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

Figure 4:
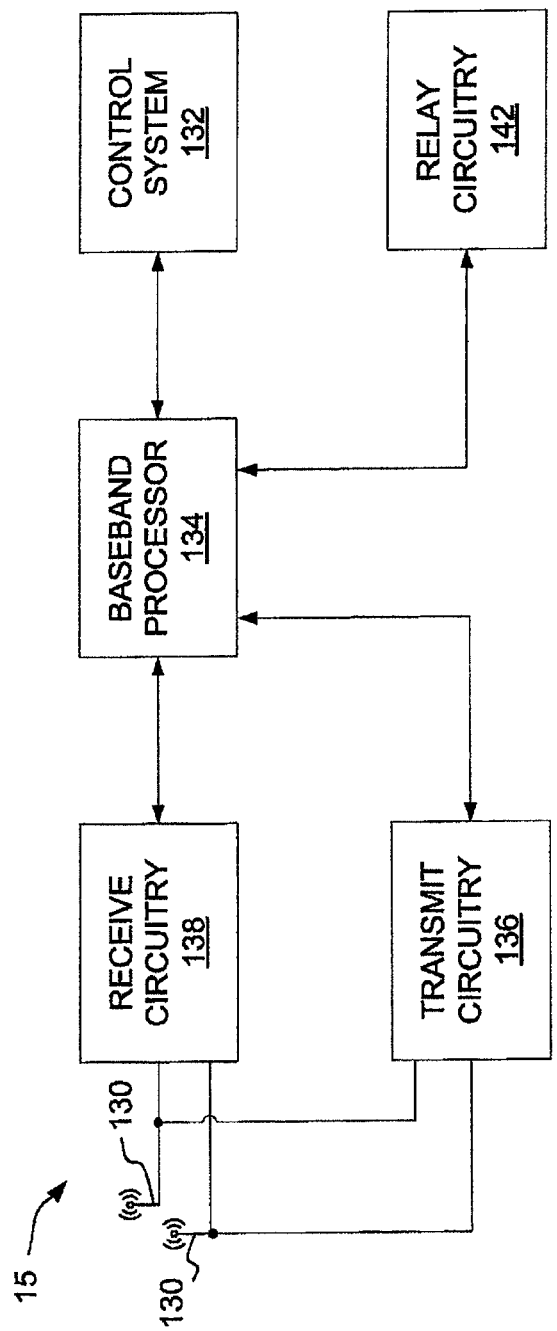
FIG. 4 is a block diagram of an example relay station that might be used to implement some embodiments of the present application.

With reference to FIG. 4, an example of a relay station 15 is illustrated. Similarly to the base station 14, and the mobile terminal 16, the relay station 15 includes a control system 132, a baseband processor 134, transmit circuitry 136, receive circuitry 138, antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
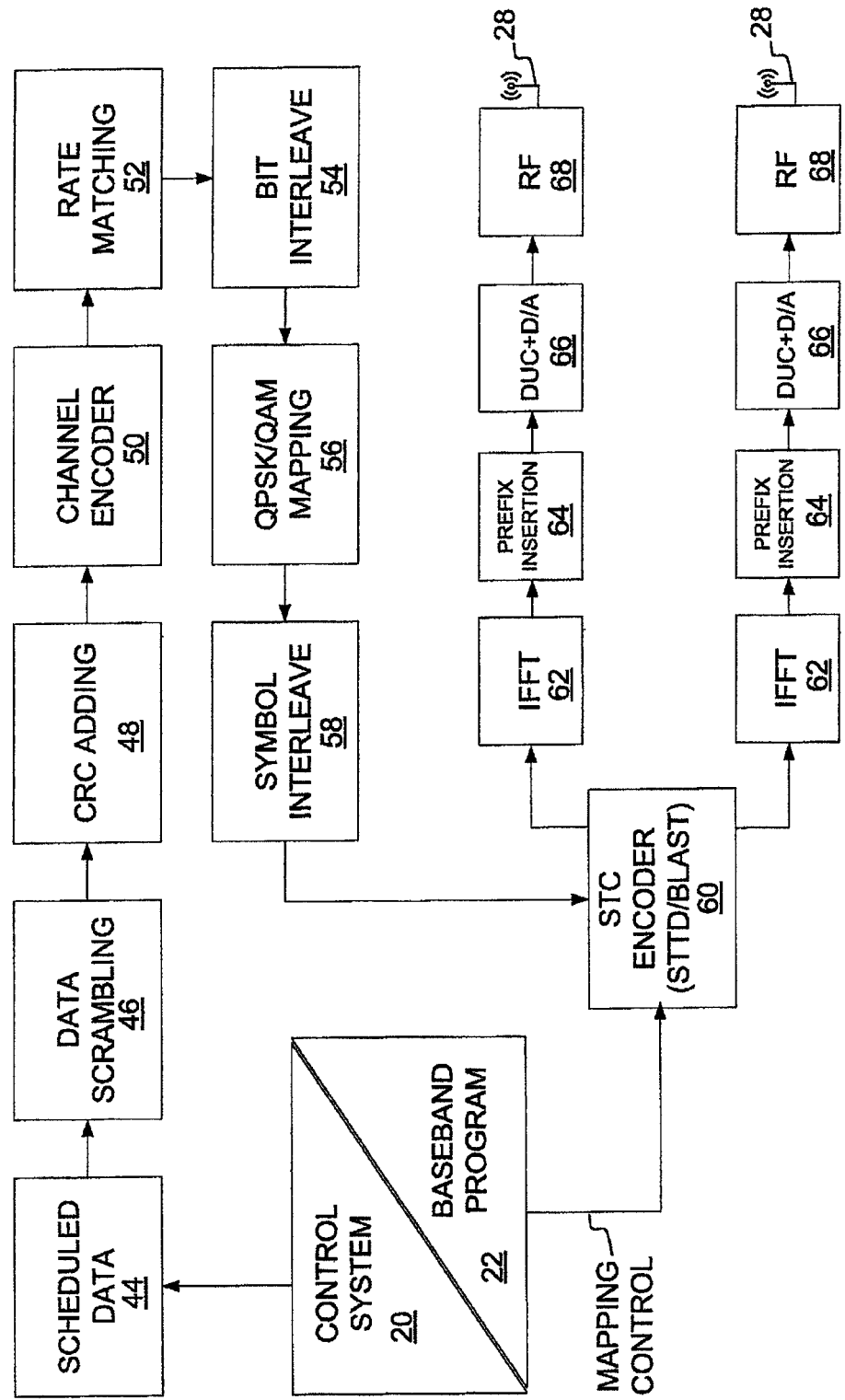
FIG. 5 is a block diagram of a logical breakdown of an example OFDM transmitter architecture that might be used to implement some embodiments of the present application.

With reference to FIG. 5, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the SIC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the TUFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUG) and digital-to-analog (DIA) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
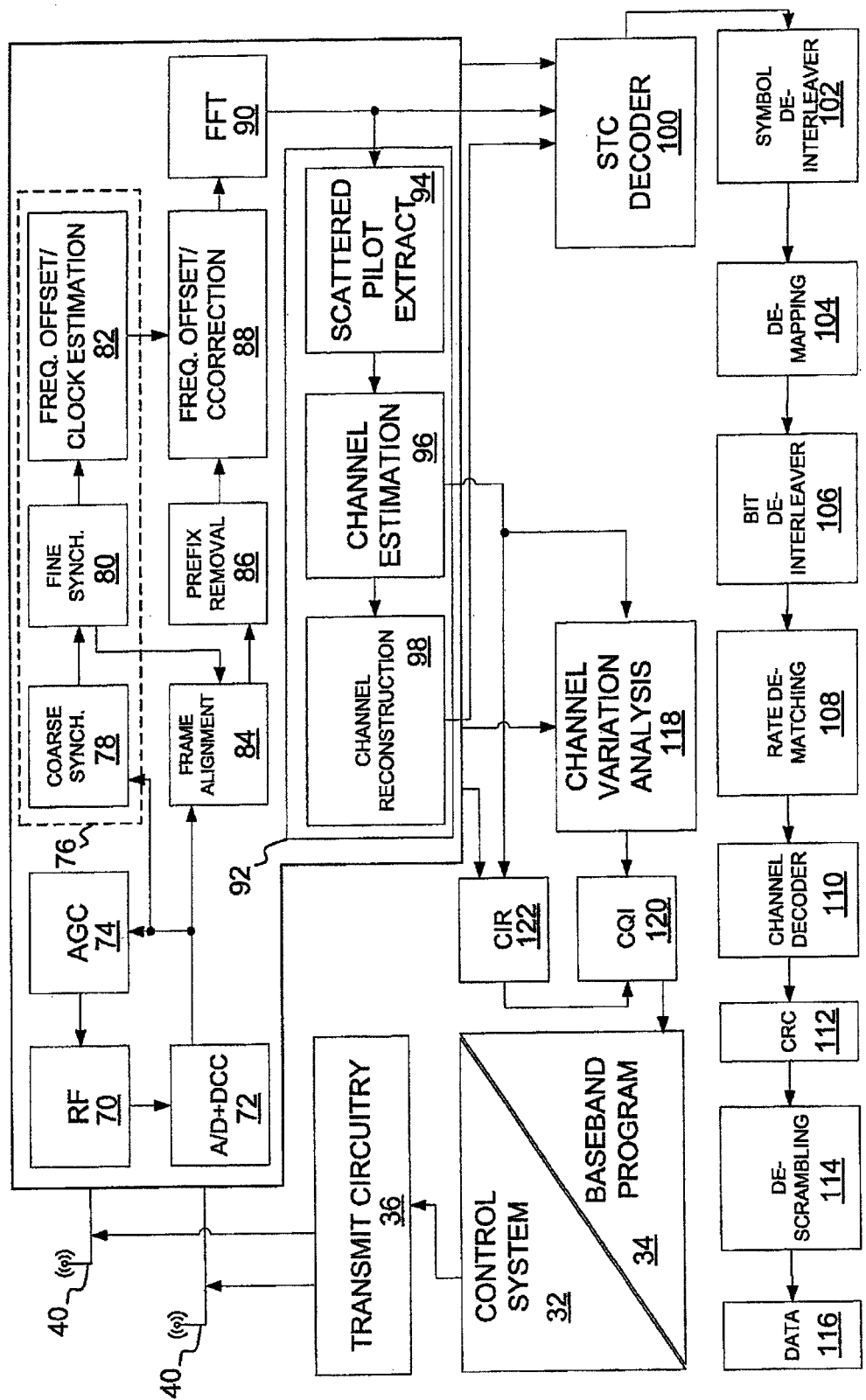
FIG. 6 is a block diagram of a logical breakdown of an example OFDM receiver architecture that might be used to implement some embodiments of the present application.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (AID) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent PET processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using EFT processing logic 90. The results are frequency domain symbols, which are sent to processing logic 92. The processing logic 92 extracts the scattered pilot signal using scattered pilot extraction logic 94, determines a channel estimate based on the- extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols. The relay station could act as another base station or as a terminal in the context of this invention.

The recovered symbols are placed back in order using symbol de-interleaver logic 102, which corresponds to the symbol interleaver logic 58 of the transmitter. The de-interleaved symbols are then demodulated or de-mapped to a corresponding bitstream using dc-mapping logic 104. The bits are then de-interleaved using bit de-interleaver logic 106, which corresponds to the bit interleaver logic 54 of the transmitter architecture. The dc-interleaved bits are then processed by rate dc-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14 As noted above, the CQI may be a function of the carrier-to-interference ratio (CIR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

In some embodiments, a relay station may operate in a time division manner using only one radio, or alternatively include multiple radios.

FIGS. 1 to 6 provide one specific example of a communication system that could be used to implement embodiments of the application. It is to be understood that embodiments can be implemented with communications systems having architectures that are different than the specific example, but that operate in a manner consistent with the implementation of the embodiments as described herein.

Figure 7:
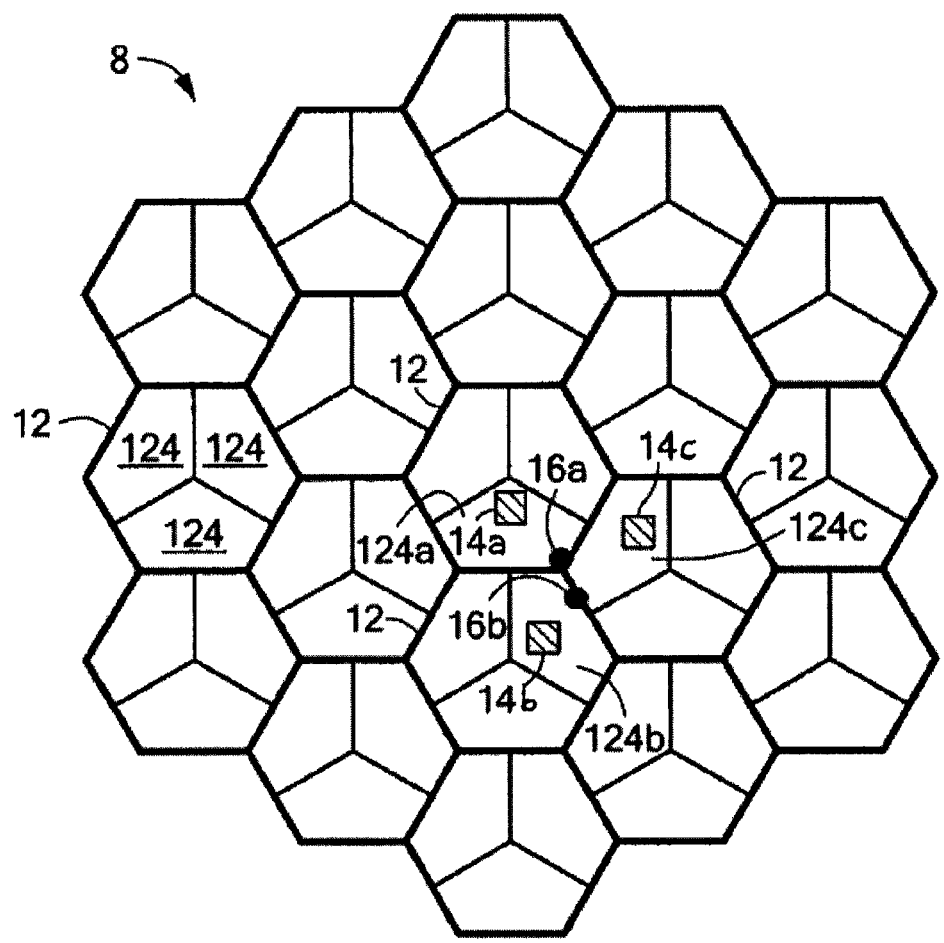
FIG. 7 is a diagram of an exemplary cell and sector architecture that might be used to implement some embodiments of the present application.

FIG. 7 is a diagram showing an exemplary arrangement of cells 12 divided into sectors or "regions" 124. Each base station 14 supports three sectors 124. Of course, cells 12 can be divided into more or fewer than three sectors. As is shown, mobile terminal 16a is on the edge of sector 124a and may be served by base station 14a and mobile terminal 16b is at the edge of sector 124b and may be served by base station 14b. Mobile terminal 16a may include base stations 14a, 14b and 14c in its active set and mobile terminal 16b may include base stations 14b and 14c in its active set.

As noted, Fractional Frequency Reuse (FFR) can be used to improve the coverage for cell edge mobile terminals 16a and 16b. In FFR, the bandwidth is divided into multiple sub-bands (hereinafter referred to as "zones") where each sector 124 defines some high power zones and some power restricted zones. A coverage gain can be obtained when neighbouring sectors 124 define non-overlapping high power zones. The zones are logical zones that can consist of tones that are either contiguous (localized zones) or non-contiguous (distributed zones). The channel condition for a cell edge interference limited mobile terminal 16 improves on the high power zone as neighbouring sectors 124 reduce the power on the power restricted zones. In order to obtain an accurate estimate of the channel on each zone, each sector 124 must define each zone using the same tones. The hopping pattern for the diversity channels in each zone should use a different hopping pattern in order to obtain interference diversity.

Figure 8:
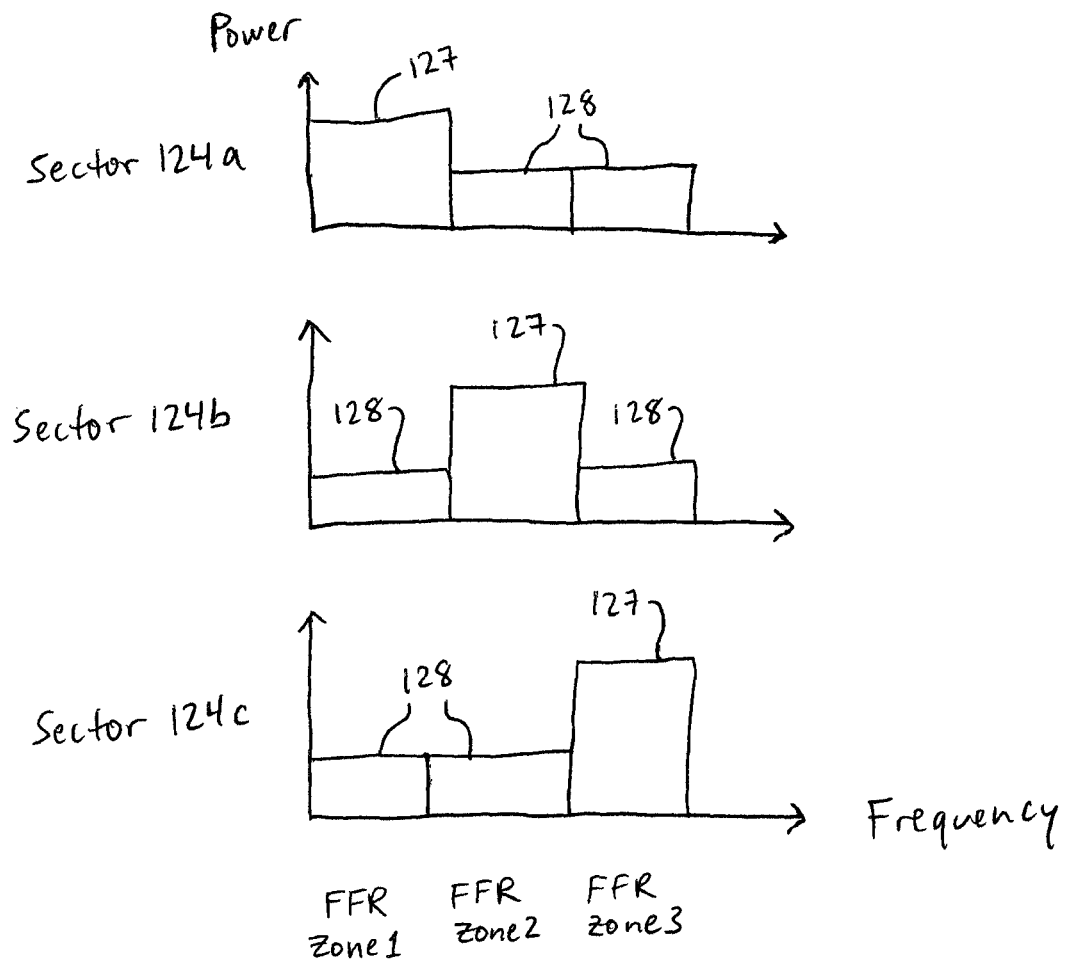
FIG. 8 is a diagram of an adaptive fractional frequency reuse scheme that might be used to implement some embodiments of the present application.

An example of an FFR allocation for sectors 124a, 124b and 124c is illustrated in FIG. 8. As shown, given there are three sectors 124 per cell 12, each sector 124 may divide the available bandwidth into three zones where one zone is a high power zone 127 and the other zones are power restricted zones 128.

Figure 9:
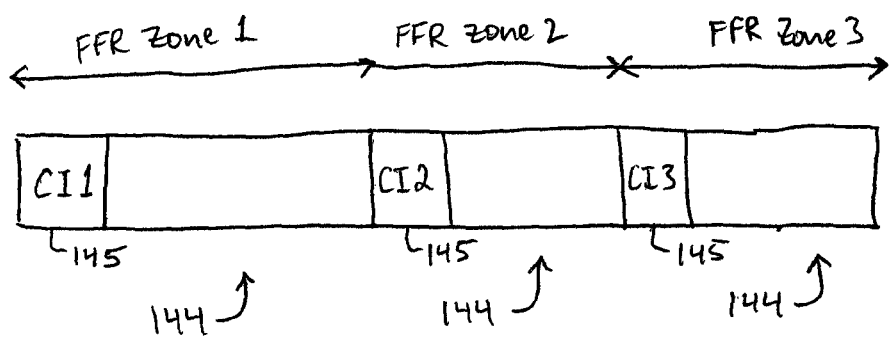
FIG. 9 is an illustration of control channels for the fractional frequency reuse zones of FIG. 8.

Each FFR zone has its own control channel. As illustrated in FIG. 9, each control channel 144 consists of a multicast control segment 145, which contains a combination index (CI). The combination index indicates how the resources within the zone are partitioned. The combination index for each zone can be encoded together and broadcast to all mobile terminals 16 or each combination index can be signalled separately in the beginning of each zone. Each partition within the FFR zone contains the control channel 144, which is located at the beginning of the partition. A cell edge mobile terminal 16 can be instructed to only decode the control information in the high power FFR zone, whereas cell centre mobile terminals 16 can attempt to decode the control information in each FFR zone.

The transmit power level on the power restricted zones 128 can be adapted in response to coverage problems. As noted, the power level may be controlled based on the backhaul communication scheme disclosed in United States Patent Application Number 2009/0061778, the contents of which are incorporated by reference herein. Alternatively, or in combination with that approach, the power level may be controlled based on feedback from mobile terminal 16 to the non-serving base stations 14 of its active set. Specifically, once the FFR zones are configured, a mobile terminal 16 that detects a strong interfering base station from the members of its active set can send an interference indicator to the interfering base station. The interference indicator for a given base station 14 indicates how much interference the base station 14 is causing to the mobile terminal 16. For example, the interference indicator can be the difference between the carrier to interference power ratios (CIRs) of the interfering base station and the serving base station. In response to receiving an interference indicator, the interfering base station can adapt its transmit power on the corresponding FFR zone. Advantageously, mobile assisted adaptive FFR allows for faster power level adaptation than the backhaul communication scheme, though a more limited number of base stations are controlled.

An uplink FFR feedback channel is required to signal the interference indicator. In some embodiments, the uplink FFR channel may be in the Packet Data Unit (PDU) header of the terminal's uplink burst. Alternatively, in some embodiments the uplink FFR channel could be a dedicated control region in the OFDMA frame that is used only for FFR, or it could be included in an existing dedicated control region. The dedicated control region may be preferred since the base station would likely have less decoding to do and could obtain the information quicker. The interference indicator can either be decoded directly by the interfering base station or it can be decoded by the serving base station and sent to the interfering base station on the backhaul. If the uplink FFR feedback channel is intended to be decoded by the interfering base station then it can be power controlled to target the intended interfering sector using either open loop or closed loop power control. Otherwise, if the uplink FFR feedback channel is intended to be decoded by the serving base station then it may be power controlled by the serving base station.

The interfering base station may combine the interference indicator with indicators from other mobile terminals. If the number of mobile terminals that report a given interference level on a dedicated channel exceeds a threshold, the interfering base station can reduce its transmit power on the corresponding FFR zone. Alternatively, in the case where the mobile terminal's serving base station allocates the FFR feedback channel(s) only when the serving base station plans to transmit data to the mobile terminal, the non-serving base station may react immediately to the feedback from the mobile terminal.

As noted, the interference indicator can be the difference between the CIRs of the serving BS and the interfering BS. Alternatively, the indicator can be a command from the mobile terminal 16 to a given interfering base station 14 to decrease the transmit power. The mobile terminal can measure the CIR on the assigned FFR zone for both the serving base station and the interfering base station since the pilot tones are orthogonal. Further, since the pilot tones are not power controlled (only the data tones are power controlled), and the transmitted level is known at both base stations, mobile terminal 16 can derive a metric (e.g., the difference between CIRs) from the relative power levels received from each base station 14 indicating how much the non-serving base station is interfering. If for example that metric exceeds a predefined threshold, mobile terminal 16 will broadcast the interference indicator.

Other modifications will be apparent to those skilled in the art and, therefore, the invention is defined in the claims.

What is claimed is:

1. A method of fractional frequency reuse in a communication network, said method comprising:

dividing a frequency band into a plurality of sub-bands according to a Fractional Frequency Reuse (FFR) scheme to define a FFR allocation of said band for a plurality of base stations, each of said base stations associated with a respective region;

at a first base station of said plurality of base stations, said first base station associated with a first region:

establishing communication with a mobile terminal in said first region on one of said plurality of sub-bands according to said FFR allocation;

at a second base station of said plurality of base stations, said second base station associated with a second region:

transmitting on said one of said plurality of sub-bands according to said FFR allocation;

receiving an indication of a coverage problem detected at said mobile terminal due to interference from said second base station on said one of said plurality of sub-bands, wherein said indication comprises a difference between the carrier to interference power ratios (CIR) of said first base station and of said second base station as detected by said mobile terminal; and in response to said receiving said indication, decreasing a transmit power level for said one of said plurality of sub-bands in said second region.

2. The method of claim 1, wherein said defining said FFR allocation comprises:

defining said one of said plurality of sub-bands as a high power sub-band for said first base station, and defining said one of said plurality of sub-bands as a power restricted sub-band for said second base station.

3. The method of claim 1 wherein receiving said indication comprises receiving said indication from said mobile terminal.

4. The method of claim 1 further comprising:

at said first base station, receiving said indication from said mobile terminal and sending said indication to said second base station.

5. The method of claim 1, wherein said indication comprises a command from said mobile terminal to said second base station to decrease said transmit power level for said one of said plurality of sub-bands.

6. The method of claim 1, wherein said communication network is an orthogonal frequency-division multiple access communication network.

* * * * *

UNITED STATES PATENT AND TRADEMARK OFFICE
CERTIFICATE OF CORRECTION

PATENT NO. : 8,649,338 B2  
APPLICATION NO. : 12/830909  
DATED : February 11, 2014  
INVENTOR(S) : Sophie Vrzic and Mo-Han Fong Page 1 of 1

It is certified that error appears in the above-identified patent and that said Letters Patent is hereby corrected as shown below:

In the Specification

Column 1 lines 5-16 should read,

Related Application Information:

This application claims the benefit of U.S. Provisional Patent Application No. 61/222,950 (converted to U.S. patent application Ser. No. 12/806,183), filed in the United States Patent Office on Jul. 3, 2009, the contents of which are incorporated by reference herein.

This application is a continuation-in-part of the non-provisional application Ser. No. 12/806,183 resulting from conversion under 37 C.P.R. §1.53(c)(3) of U.S. provisional patent application No. 61/222,950 filed on Jul. 3, 2009, which claims the benefit of U.S. provisional patent application No. 61/078,534 filed on Jul. 7, 2008.

Signed and Sealed this  
Twenty-seventh Day of May, 2014

Michelle K. Lee  
*Deputy Director of the United States Patent and Trademark Office*